(12) United States Patent
Lee et al.

(10) Patent No.: US 10,378,596 B2
(45) Date of Patent: Aug. 13, 2019

(54) WEDGE CLUTCH WITH ANTI-EXPANSION RETAINER

(71) Applicant: SCHAEFFLER TECHNOLOGIES AG & CO. KG, Herzogenaurach (DE)

(72) Inventors: Brian Lee, York, SC (US); Ryan Carlino, Charlotte, NC (US); Marion Jack Ince, Mount Holly, NC (US); Carsten Ohr, Charlotte, NC (US); Christian Fuerstenhoefer, Vestenbergsgreuth (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 254 days.

(21) Appl. No.: 15/437,590

(22) Filed: Feb. 21, 2017

(65) Prior Publication Data

US 2018/0238396 A1 Aug. 23, 2018

(51) Int. Cl.
| | |
|---|---|
| *F16D 13/14* | (2006.01) |
| *F16D 13/16* | (2006.01) |
| *F16D 15/00* | (2006.01) |
| *F16D 25/065* | (2006.01) |

(52) U.S. Cl.
CPC ............ *F16D 13/16* (2013.01); *F16D 15/00* (2013.01); *F16D 25/065* (2013.01)

(58) Field of Classification Search
CPC .......... F16D 13/14; F16D 13/16; F16D 13/66; F16D 13/646; F16D 41/061; F16D 2041/0606
See application file for complete search history.

(56) References Cited

U.S. PATENT DOCUMENTS

| | | | |
|---|---|---|---|
| 2015/0014113 A1 | 1/2015 | Ohr et al. | |
| 2015/0083539 A1 | 3/2015 | Lee et al. | |
| 2015/0152921 A1 | 6/2015 | Lee | |
| 2016/0084326 A1 | 3/2016 | Ramsey | |
| 2017/0198761 A1* | 7/2017 | Ince ........................ | F16D 13/16 |
| 2017/0227063 A1* | 8/2017 | Ince ........................ | F16D 13/16 |
| 2017/0227065 A1* | 8/2017 | Ince ........................ | F16D 15/00 |
| 2018/0187725 A1* | 7/2018 | Ince ........................ | F16D 13/16 |

OTHER PUBLICATIONS

Lee, Brian, "AWD Disconnect, Escaping the clutches of the dog", Schaeffler Symposium 2014, 26 pages.

* cited by examiner

*Primary Examiner* — Huan Le
(74) *Attorney, Agent, or Firm* — Brooks Kushman P.C.

(57) ABSTRACT

A clutch includes a carrier defining an annular groove and a hub coaxial with the carrier and defining an outer surface. The hub is axially movable relative to the carrier between at least a first position and a second position. A wedge disk has a first edge disposed on the outer surface, a second edge disposed in the annular groove, and a face extending between the edges and defining an annular shoulder. The disk engages between the carrier and the hub when the hub is in the first position to lock the clutch, and the carrier and the hub are rotatable relative to each other when the hub is in the second position. An annular retainer is configured to prevent radial expansion of the disk when the hub is in the second position and to permit radial expansion of the disk when the hub is in the first position.

20 Claims, 3 Drawing Sheets

WEDGE CLUTCH WITH ANTI-EXPANSION RETAINER

TECHNICAL FIELD

The present disclosure relates to wedge clutches for coupling two or more components, and more specifically to a wedge clutch having a retainer for preventing inadvertent expansion of a wedge disk of the wedge clutch.

BACKGROUND

A vehicle powertrain may include a wedge clutch for coupling an input shaft to an output shaft. The wedge clutch includes an inner race connected to one of the shafts and an outer race connected to the other of the shafts. A wedge disk is radially disposed between the inner and outer races and is configured to engage the inner and outer races when the clutch is locked to transmit power from the input shaft to the output shaft.

SUMMARY

According to one embodiment, a clutch includes a carrier defining an annular groove and a hub coaxial with the carrier and defining an outer surface. The hub is axially movable relative to the carrier between at least a first position and a second position. A wedge disk of the clutch has a first edge disposed on the outer surface, a second edge disposed in the annular groove, and a face extending between the edges and defining an annular shoulder. The disk engages between the carrier and the hub when the hub is in the first position to lock the clutch, and the carrier and the hub are rotatable relative to each other when the hub is in the second position. An annular retainer has a first portion connected to the hub and a second portion encircling the shoulder. The second portion is configured to prevent radial expansion of the disk when the hub is in the second position and to permit radial expansion of the disk when the hub is in the first position.

According to another embodiment, a clutch includes a carrier, a hub, and a wedge disk radially disposed between the carrier and the hub. The wedge disk is configured to radially expand to frictionally engage between the hub and carrier when the clutch is locked. A retainer is configured to engage with a shoulder of the wedge disk to prevent radial expansion of the wedge disk when the clutch is unlocked.

According to another embodiment, a clutch includes an outer race supported for rotation about an axis and defining an annular groove and an inner race supported for rotation about the axis and defining a tapered surface with a cammed profile projecting radially outward. A disk of the clutch has an outer edge disposed in the groove and an inner edge with a cammed profile disposed on the tapered surface. The cammed profiles cooperate to radially expand the disk into frictional engagement with the groove to lock the clutch when the disk and the inner race rotate relative to each other. A retainer is axially moveable relative to the disk and is configured to engage with the disk to prevent radial expansion of the disk when the retainer is in a first position corresponding to an unlocked state of the clutch and not engage with the disk when the retainer is in a second position corresponding to a locked state of the clutch.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
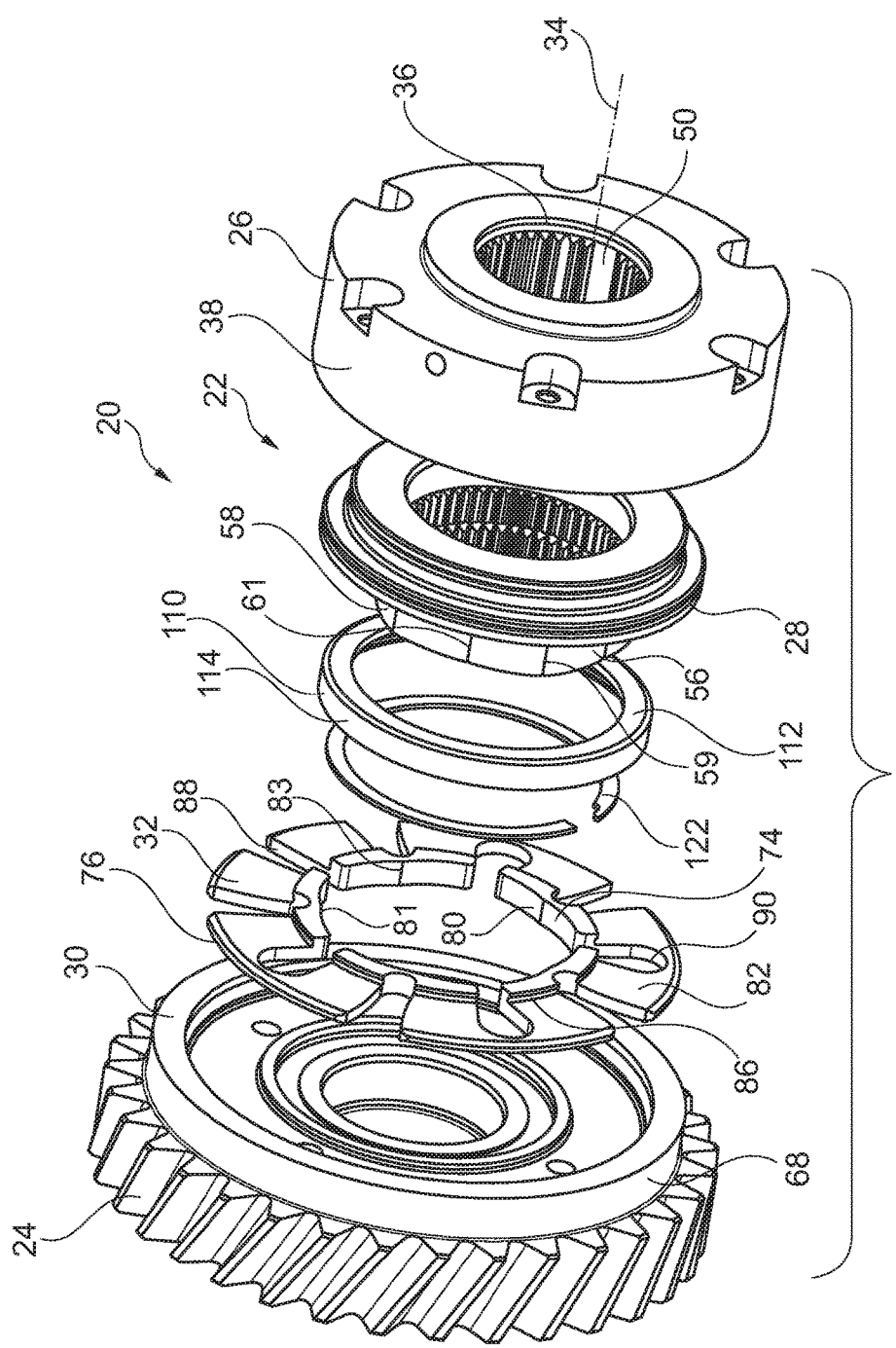
FIG. 1 illustrates an exploded view of a wedge clutch.
Figure 2:
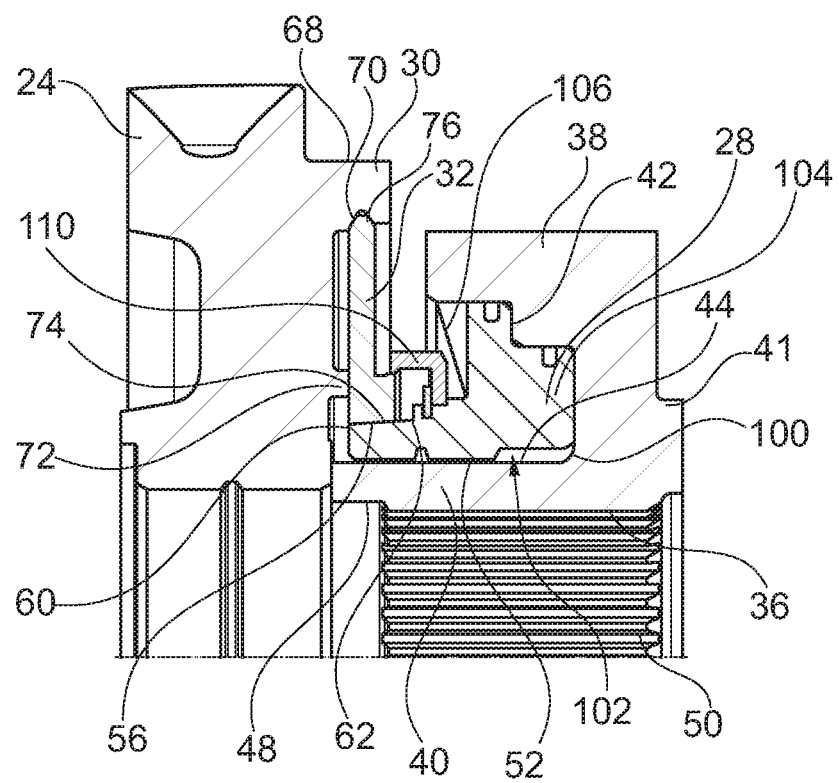
FIG. 2 illustrates a side cross-sectional view of the wedge clutch in an unlocked state.

Referring to FIGS. 1 and 2, a powertrain component 20 for a vehicle is shown. The powertrain component 20 may be configured for a road vehicle such as a passenger car or pickup truck, or may be for heavy machinery such as a tractor. The powertrain component 20 may include a wedge clutch 22 operable to driveably connect two or more components to each other. Two components are driveably connected if they are connected by a power flow path that constrains their rotational speeds to be directly proportional. For example, the clutch 22 may connect two rotatable components to each other or may act as a brake to fix a rotatable component to a stationary housing. In one example use, the wedge clutch 22 is used in a power-transfer unit of an all-wheel drive powertrain; in another example use, the wedge clutch 22 is used in a transmission. Of course, the wedge clutch 22 may be utilized in many other applications.

The powertrain component 20 may include a gear 24 on generally one side of the assembly and a housing 26 on the other side of the assembly. The wedge clutch 22 is disposed between the gear 24 and the housing 26 and is operable to rotationally fix the gear 24 and the housing 26 when the clutch is locked, and to permit relative rotation between the gear 24 and the housing 26 when the clutch is unlocked. The gear 24, the wedge clutch 22, and the housing 26 are supported for rotation about an axis 34.

The housing 26 may have an inner bore 36 that receives a shaft (not shown). The inner bore may define grooves 50 that cooperate with splines of the shaft to connect the shaft to the powertrain component 20. The housing 26 may also have an outer axially extending portion 38, an inner axially extending portion 40, and a radially extending portion 41. The inner portion 40 may include an outer side 44 defining spines and an inner side 48 that defines the inner bore 36. While not shown, the powertrain component 20 may include support structures that secure the gear 24 and the housing 26 adjacent to each other as shown in FIG. 2. For Example, a shaft shoulder may locate the gear and a threaded fastener holds the housing 26 in place.

The wedge clutch 22 may include a hub 28 (which may be referred to as an inner race), a carrier 30 (which may be referred to as an outer race, and a wedge disk 32 (which may be referred to as a wedge plate), that are all concentrically arranged and supported for rotation about the axis 34.

The hub 28 is received within a pocket 42 of the housing 26 and is slidably seated on the inner axially extending portion 40. The hub 28 includes an inner surface 52 that defines grooves that engage with splines to connect the hub 28 to the housing 26. The spline connection allows the hub 28 to axially move relative to the housing 26 and constrains rotational movement of the hub 28 relative to the housing 26. The hub 28 may also include a tapered surface 56 that angles radially outward from a first end 60 towards a second end 62.

The carrier 30 may be attached to the gear 24 or may be integrally formed on a face of the gear 24. The carrier 30 includes an axially extending portion 68 defining a groove 70 and a projection 72 that engages with a face of the wedge disk 32.

The wedge disk 32 is radially disposed between the hub 28 and the carrier 30. An inner edge 74 of the disk 32 defines a generally circular opening that is received on the hub 28 and seated on the tapered surface 56. An outer edge 76 of the disk 32 is disposed in the groove 70 of the carrier 30. When the clutch 22 is locked, the disk 32 frictionally engages with the groove 70 and the inner edge 74 engages with the tapered surface 56 to couple the carrier 30 to the hub 28 creating a power flow path between the gear 24 and the housing 26.

As stated above, the clutch 22 has a locked state (also referred to as a closed state) in which the gear 24 and housing 26 are rotationally fixed to each other and an unlocked state (also referred to as an open state) in which the gear 24 and housing 26 are independently rotatable relative to each other. The tapered surface 56 of the hub 28 is not a perfect circle and includes a cammed profile 58 having lobes 59 that extend radially outward from the center of the hub and valleys 61 disposed between the lobes 59. The inner edge 74 of the disk 32 also has a cammed profile 80 having pockets 81 and peaks 83 disposed between the pockets. The cammed profiles 58 and 80 have substantially matching shapes such that the lobes 59 are received in the pockets 81 and the peaks 83 are received in the valleys 61 when the hub and disk are in a first rotational position relative to each other. In the first rotational position, which corresponds to an unlocked state of the clutch, the disk is not expanded.

When the disk 32 and hub 28 rotate relative to each other, the cammed profiles 58, 80 become misalign, i.e., the lobes 59 slide out of the pockets 81 and the peaks 83 slide out of the valleys 61, causing radial expansion of the disk 32. Radial expansion of the disk 32 causes the disk to frictionally engage with the groove 70 of the carrier 30. The disk 32 may be formed of a resilient material and may include a split 88 and slots 90 to facilitate radial expansion of the disk 32. In some embodiments, the disk 32 may include multiple segments retained together by an annular resilient member.

Figure 3:
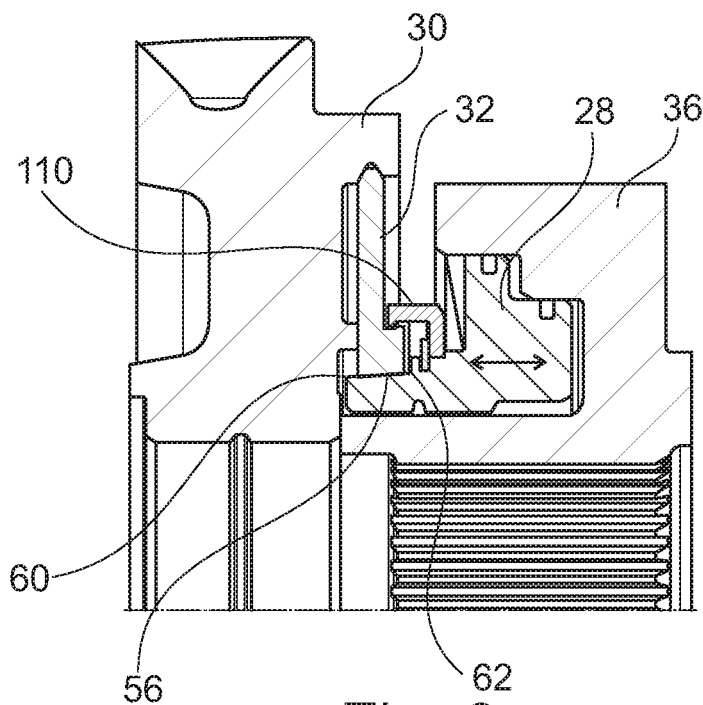
FIG. 3 illustrates a side cross-sectional view of the wedge clutch in a locked state.

In FIG. 2, the clutch 22 is illustrated in the unlocked state with the disk 32 being near a first end 60 of the hub and being loosely disposed in the groove 70. Locking of the clutch 22 is initiated by sliding the hub 28 towards the gear 24 causing the disk 32 to slide on the tapered surface 56. The increasing diameter of the tapered surface 56 slightly expands the disk 32 as it moves towards the second end 62 of the hub creating friction between the disk 32 and the carrier 30. The friction force between the carrier 30 and the disk 32 decelerates the disk 32 causing relative rotation between the disk 32 and the hub 28. When the disk 32 and the hub 28 rotate relative to each other, the cams 58 and 80 cooperate to further radially expand the disk 32 increasing the frictional engagement with the groove 70 causing the clutch 22 to lock. FIG. 3 illustrates the clutch 22 in the locked state with the disk 32 adjacent to the second end 62 of the tapered surface 56. The clutch 22 is considered locked when the rotational speed difference between the hub 28 and the carrier 30 approximates zero.

An actuator moves the hub 28 relative to the disk 32 to cycle the clutch between the open and closed states. The actuator may be an electric actuator, a hydraulic actuator, a mechanical actuator, or any other type known in the art. The actuator may be configured to slide the hub 28 towards gear 24, slide the hub 28 away from the gear 24, or both. In some embodiments, the actuator only slides the hub 28 towards the gear 24 and a biasing member urges the hub 28 away from the gear 24.

In the illustrated embodiment, a hydraulic actuator 100 is used to actuate the hub 28. The housing 26 and a rear portion 104 of the hub 28 cooperate to define a hydraulic chamber 102. A fluid (such as oil) is supplied to the hydraulic chamber 102 to force the hub 28 towards the carrier 30 when the clutch 22 is to be locked. A resilient member 106 (such as a diaphragm spring) engages between the housing 26 and the hub 28 to urge the hub 28 away from the carrier 30.

Centrifugal force can cause unwanted radial expansion of the disk 32 when the clutch 22 is utilized in high-speed applications (such as above 4,000 revolutions per minute). This expansion of the disk can create a power-flow path through the clutch during times when the clutch is commanded to be unlocked. The clutch 22 includes an anti-expansion retainer 110 that constrains the disk 32 when the clutch is open to prevent centrifugal forces from expanding the disk.

Figure 4:
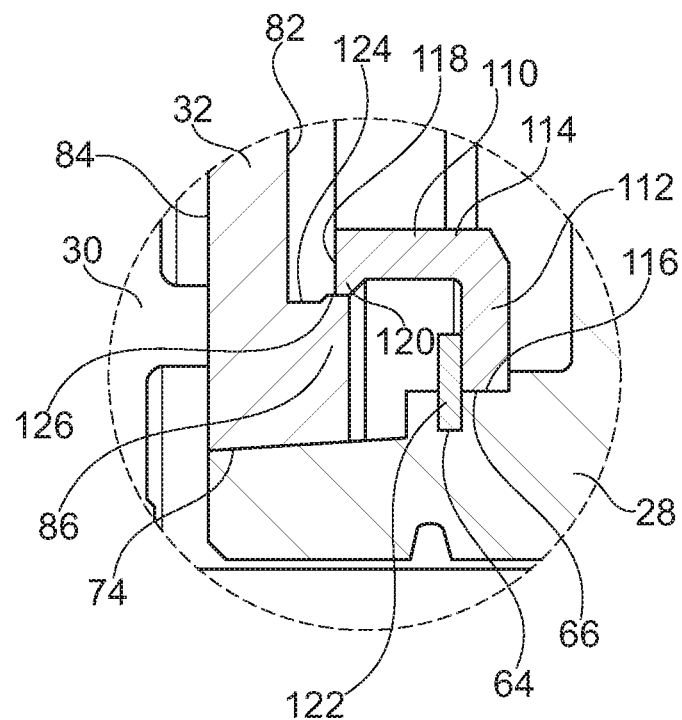
FIG. 4 illustrates a magnified view of the wedge clutch of FIG. 2.

Referring to FIGS. 1 and 4, the retainer 110 is axially movable relative to the disk 32 so that the retainer 110 can engage with the disk 32 when the clutch is open to prevent centrifugal expansion and can disengaged with the disk when the clutch is closing to allow desired expansion of the disk. The disk 32 includes opposing first and second faces 82, 84 that extend between the inner edge 74 and the outer edge 76. The first face 82 may define a shoulder 86 facing the hub 28 and configured to engage with the retainer 110. The shoulder 86 may be located near the inner diameter of the disk 32 and may extend from the inner edge 74 to an intermediate position of the face 82. The shoulder 86 may include a main annular surface 124 and a lip 126 raised from the main surface 124 and extending radially outward. The lip 126 may be the component of the disk 32 that engages with the retainer 110.

The retainer 110 may be annular and supported for rotation about the axis 34. The retainer 110 may include a radially extending portion 112 and an axially extending portion 114. The radially extending portion 112 may be attached to the hub 28. For example, the hub 28 may define a retainer seat 66 and an adjacent snap-ring groove 64. An inner edge 116 of the retainer 110 is received on the seat 66 and a snap ring 122 is installed in the groove 64 to secure the retainer 110 to the hub 28. By attaching the retainer 110 to the hub 28, movement of the hub 28 and the retainer 110 is synchronized. The retainer 110 could also be welded to the hub or attached using other known techniques.

The axially extending portion 114 may encircle at least a portion of the shoulder 86. The axially extending portion 114 defines a lip 120 disposed on a tip 118 of the portion 114. The lip 120 extends radially inward from an inner surface of the axially extending portion 114. The shoulder 86 and the retainer 110 are sized and arranged such that the lip 120 of the retainer 110 engages with the lip 126 of the disk 32 when the hub 28 is in the position shown in FIG. 4, which corresponds to an unlocked state of the clutch 22.

Figure 5:
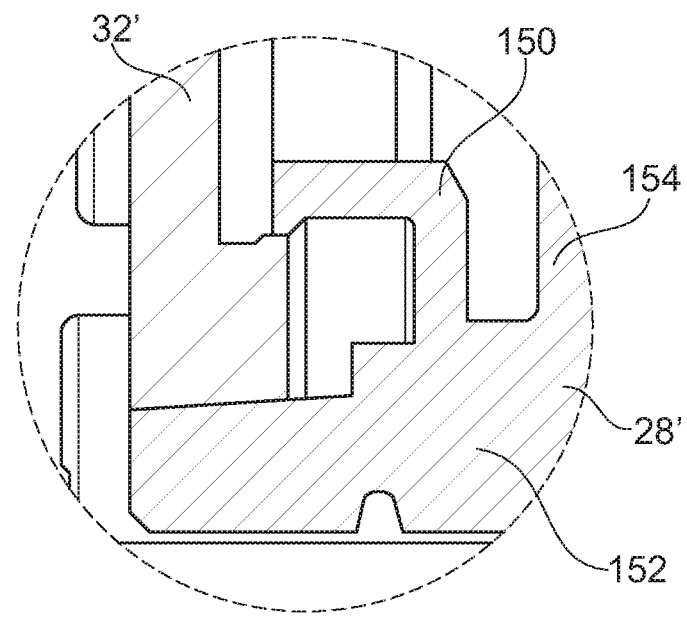
FIG. 5 illustrates a magnified view of another wedge clutch.

Referring to FIG. 5, the retainer may be integrally formed with the hub in one or more embodiments. For example, the hub 28' may include a retainer portion 150 that engages with the wedge disk 32' to prevent unwanted expansion of the disk. The retainer portion 150 may extend from an axially extending portion 152 of the hub 28' as illustrated or may extend from a radially extending portion 154.

Referring to FIG. 3, when the hub 28 is moved towards the carrier 30 to lock the clutch 22, the lip 120 disengages with the lip 126 providing clearance for the necessary radial expansion of the disk 32 so that the clutch can be locked without interference from the retainer 110.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A clutch comprising:
   a carrier defining an annular groove;
   a hub coaxial with the carrier and defining an outer surface, wherein the hub is axially movable relative to the carrier between at least a first position and a second position;
   a wedge disk including a first edge disposed on the outer surface, a second edge disposed in the annular groove, and a face extending between the edges and defining an annular shoulder, wherein the disk engages between the carrier and the hub when the hub is in the first position to lock the clutch, and the carrier and the hub are rotatable relative to each other when the hub is in the second position; and
   an annular retainer having a first portion connected to the hub and a second portion encircling the shoulder, wherein the second portion is configured to prevent radial expansion of the disk when the hub is in the second position and to permit radial expansion of the disk when the hub is in the first position.

2. The clutch of claim 1, wherein the first portion extends radially and the second portion extends axially.

3. The clutch of claim 1, wherein the shoulder defines a raised lip that is engaged with the retainer when the hub is in the second position and is disengaged with the retainer when the hub is in the first position.

4. The clutch of claim 1, wherein the retainer is integrally formed with the hub.

5. A clutch comprising:
   a carrier;
   a hub;
   a wedge disk radially disposed between the carrier and the hub and having a shoulder, wherein the wedge disk is configured to radially expand to frictionally engage between the hub and carrier when the clutch is locked; and
   a retainer configured to engage with the shoulder to prevent radial expansion of the wedge disk when the clutch is unlocked.

6. The clutch of claim 5, wherein the retainer is annular.

7. The clutch of claim 5, wherein the retainer is axially moveable relative to the wedge disk and is configured to engage with a portion the shoulder when in a first position to prevent radial expansion of the wedge disk and to disengage with the portion when in a second position allowing radial expansion of the wedge disk.

8. The clutch of claim 7, wherein the shoulder defines a raised lip, and the retainer is configured to engage with the lip when in the first position and to disengaged with the lip when in the second position.

9. The clutch of claim 8, wherein the retainer defines a lip that extends radially inward from an axially extending portion of the retainer, and wherein the lip of the retainer engages with the lip of the shoulder when the retainer is in the first position.

10. The clutch of claim 5, wherein the retainer includes an axially extending portion encircling at least a portion of the shoulder and a radially extending portion attached to the hub.

11. The clutch of claim 10, wherein the hub defines a seat that receives the radially extending portion and defines a groove adjacent to the seat, and further comprising a snap ring disposed in the groove to secure the retainer in the seat.

12. The clutch of claim 5, wherein the carrier defines an annular groove and an outer edge of the wedge disk is disposed in the annular groove, and the wedge disk defines an inner edge received on an outer surface of the hub.

13. The clutch of claim 12, wherein the outer surface of the hub defines radially extending cams configured to cooperate with associated cams formed on the inner edge of the wedge disk to expand the wedge disk in response to relative rotation between the wedge disk and the hub to lock the clutch.

14. The clutch of claim 5, wherein the hub defines a tapered surface and the wedge disk is disposed on the tapered surface, and the hub is axially moveable relative to the wedge disk between at least a first position in which the clutch is locked and a second position in which the clutch is unlocked.

15. The clutch of claim 5, wherein the retainer is integrally formed with the hub.

16. A clutch comprising:
    an outer race supported for rotation about an axis and defining an annular groove;
    an inner race supported for rotation about the axis and defining a tapered surface with a cammed profile projecting radially outward;
    a disk including an outer edge disposed in the groove and an inner edge with a cammed profile disposed on the tapered surface, wherein the cammed profiles cooperate to radially expand the disk into frictional engagement with the groove to lock the clutch when the disk and the inner race rotate relative to each other; and
    a retainer axially moveable relative to the disk and configured to engage with the disk to prevent radial expansion of the disk when the retainer is in a first position corresponding to an unlocked state of the clutch and to not engage with the disk when the retainer is in a second position corresponding to a locked state of the clutch.

17. The clutch of claim 16, wherein the disk further includes a face extending between the inner and outer edges and defining a shoulder, and the retainer is configured to engage the shoulder when in the first position.

18. The clutch of claim 17, wherein the shoulder defines a raised lip extending radially outward, and the retainer defines a raised lip extending radially inward, and wherein the lips engage each other when the retainer is in the first position and are not engaged with each other when in the second position.

19. The clutch of claim 16, wherein the retainer is annular.

20. The clutch of claim 19, wherein the retainer includes an axially extending portion engageable with the disk and a radially extending portion attached to the inner race.

* * * * *